Sept. 1, 1970     W. F. ROTHROCK     3,526,366
OXYGEN-JET CUTTING TIP
Filed May 7, 1968
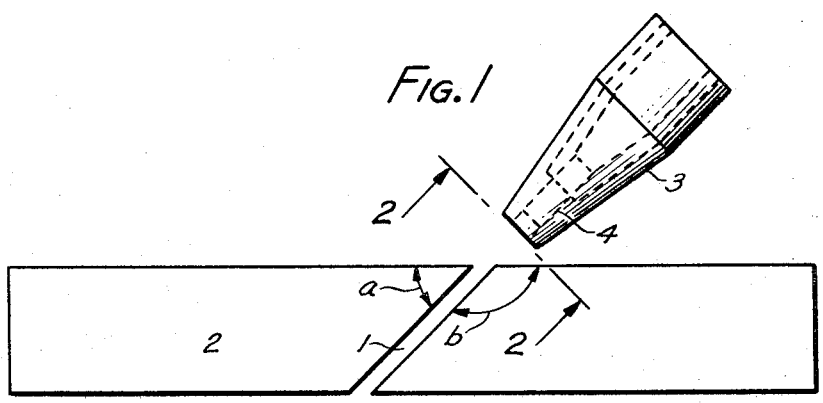
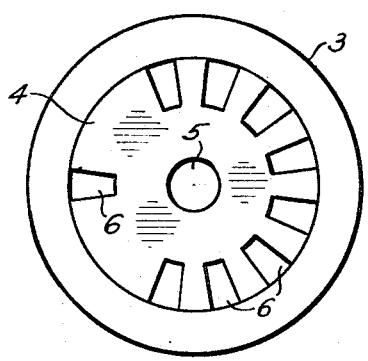
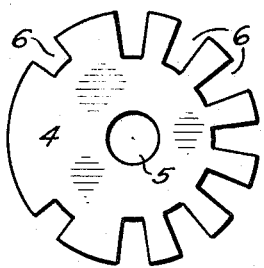
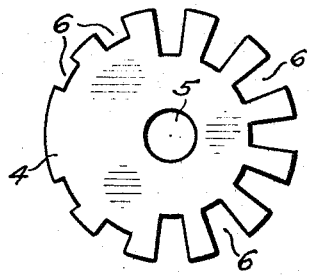
INVENTOR
*William F. Rothrock*

United States Patent Office 3,526,366
Patented Sept. 1, 1970

3,526,366
OXYGEN-JET CUTTING TIP
William F. Rothrock, Bethlehem, Pa., assignor to Bethlehem Steel Corporation, a corporation of Delaware
Filed May 7, 1968, Ser. No. 727,185
Int. Cl. B05b 7/06
U.S. Cl. 239—424                    2 Claims

ABSTRACT OF THE DISCLOSURE

A tip for an oxygen-jet cutting torch makes a bevel cut in a metal workpiece wherein conduits delivering preheating gas are asymmetrically spaced around a conduit delivering the cutting jet of oxygen. These preheating conduits are positioned so that fewer deliver gas onto the acute angle side of the bevel cut than onto the obtuse angle side, and thereby avoid overheating of the acute angle. To supplement this asymmetrical spacing, those conduits heating the acute angle side may be sized smaller than those heating the obtuse angle side. In addition, a tip containing a removable insert member having a bore forming the oxygen-delivering conduit, having grooves in its outer surface through which the preheating gas passes, and which is closely surrounded by a sleeve, may be used for either perpendicular or bevel cuts by selecting an insert member having either symmetrically or asymmetrically spaced grooves.

BACKGROUND OF THE INVENTION

This invention relates to an oxygen-jet cutting torch tip and, more particularly, to a tip for an oxygen-jet cutting torch making a bevel cut in a metal workpiece.

The usual tip for an oxygen-jet cutting torch has a central oxygen-delivering conduit symmetrically surrounded by a plurality of conduits through which a fuel gas, as propane, is fed. Burning of the fuel gas preheats the workpiece to a temperature sufficient to allow oxidation when the oxygen jet impinges upon it. Although this tip performs satisfactorily for cuts perpendicular to the workpiece's surface, it often causes overheating of the acute angle side when making a bevel cut and thereby reduces that angle's sharpness.

SUMMARY OF THE INVENTION

According to the invention, the preheating conduits of an oxygen-jet cutting torch tip are asymmerically spaced around the oxygen-delivering conduit when the torch makes a bevel cut in a metal workpiece. During the cutting process, the preheating conduits are positioned such that fewer deliver preheating gas onto the acute angle side of the bevel cut than onto the obtuse angle side. This arrangement avoids overheating of the acute angle and thereby improves its sharpness. The asymmetrical spacing may be supplemented by using smaller sized preheating conduits for heating the acute angle side than for heating the obtuse angle side.

Either perpendicular or bevel cuts may be made by a tip containing a removable insert member closely surrounded by a sleeve, having a bore forming the oxygen-delivering conduit, and having grooves in its outer surface through which the preheating gas is delivered. By choosing an insert member having symmetrical or asymmetrical spaced grooves, such a tip may be used to produce either perpendicular or bevel cuts.

BRIEF DESCRIPTION OF THE DRAWING

FIG. 1 shows the tip of an oxygen-jet cutting torch making a bevel cut in a metal workpiece.

FIG. 2 is an enlarged view along line 2—2 of FIG. 1 and shows a cutting tip according to the invention.

FIGS. 3 and 4 show two additional insert members which may be used with the cutting tip.

DESCRIPTION OF THE PREFERRED EMBODIMENTS

In FIG. 1, a bevel cut 1 having an acute angle $a$ and an obtuse angle $b$ is being made in a metal workpiece 2 by an oxygen-jet cutting torch. The tip of the torch includes a sleeve 3 having a cylindrical inner surface at its lower end. Within the sleeve and closely surrounded by its cylindrical inner surface is an insert member 4 slightly recessed from the tip's end.

As shown in FIG. 2, the insert member 4 has a central bore 5 and a plurality of longitudinally extending grooves 6 in its outer surface. Bore 5 forms a conduit for delivering the cutting jet of oxygen and preheating gas is delivered onto the workpiece 2 through the grooves 6. These grooves are asymmetrically spaced around the bore and positioned so that a lesser number of them deliver preheating gas onto the acute angle side of bevel cut 1 than onto the obtuse angle side. This arrangement avoids overheating of acute angle $a$ and thereby preserves its sharpness.

Insert member 4 is removable from the cutting tip and, where a perpendicular cut is required, may be replaced by an insert member having symmetrically spaced grooves.

FIGS. 3 and 4 show two additional inserts having asymmetrically spaced grooves. In FIG. 3, the grooves in one portion of the insert are of smaller size than the others. This size difference supplements the grooves' asymmetrical spacing; the smaller sized grooves are those farther spaced apart and directing preheating gas onto the acute angle side of the bevel cut. In FIG. 4, the grooves which direct preheating gas onto the acute angle side are again smaller in size. However, these successively decrease in size as they are located farther away from the larger grooves which are equally sized. This arrangement achieves a smooth transition from the higher temperature of the obtuse angle side to the lower temperature of the acute angle side of the bevel cut.

I claim:
1. A tip for an oxygen-jet cutting torch comprising:
    (a) a housing having an inlet end and a discharge end,
    (b) means for providing a supply of oxygen to said housing at said inlet end and,
    (c) means for providing a supply of preheating gas to said housing at said inlet end,
    (d) a removable insert member mounted in said housing adjacent said discharge end and having a bore therethrough for delivery of said supply of oxygen and a plurality of longitudinal grooves in its outer surface,
    (e) said housing surrounding the grooved outer surface of said insert member and forming therewith a circular pattern of conduits for the delivery of said preheating gas,
    (f) said conduits providing a series of small openings on a first portion of the periphery of said insert member and a series of larger openings on a portion of said periphery diametrically opposite to said first portion.
2. A tip for an oxygen-jet cutting torch comprising:
    (a) a housing having an inlet end and a discharge end,
    (b) means for providing a supply of oxygen to said housing at said inlet end,

(c) means for providing a supply of preheating gas to said housing at said inlet end, (d) a removable insert member mounted in said housing adjacent said discharge end and having a bore therethrough for delivery of said supply of oxygen and a plurality of longitudinal grooves in its outer surface, (e) said housing surrounding the grooved outer surface of said insert member and forming therewith a circular pattern of conduits for the delivery of said preheating gas, (f) said conduits providing a first series of equally sized openings on a first portion of the periphery of said insert member and a second series of openings successively decreasing in size away from said first series extending diametrically opposite said first portion.

References Cited
UNITED STATES PATENTS

| | | | |
|---|---|---|---|
| 2,258,456 | 10/1941 | Jones | 239—424.5 |
| 2,468,824 | 5/1949 | Hughey | 239—552 |
| 2,517,641 | 8/1950 | Dod | 239—549 X |
| 2,517,642 | 8/1950 | Dod | 239—549 X |

ALLEN N. KNOWLES, Primary Examiner

J. J. LOVE, Assistant Examiner

U.S. Cl. X.R.

239—552